United States Patent
Rulkens et al.

(10) Patent No.: US 9,315,625 B2
(45) Date of Patent: Apr. 19, 2016

(54) MELT-PROCESSABLE POLYAMIDE WITH HIGH MELTING TEMPERATURE

(71) Applicant: DSM IP ASSETS B.V., Heerlen (NL)

(72) Inventors: Rudy Rulkens, Echt (NL); Atze Jan Nijenhuis, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 14/400,925

(22) PCT Filed: May 24, 2013

(86) PCT No.: PCT/EP2013/060781
§ 371 (c)(1),
(2) Date: Nov. 13, 2014

(87) PCT Pub. No.: WO2013/174995
PCT Pub. Date: Nov. 28, 2013

(65) Prior Publication Data
US 2015/0141613 A1    May 21, 2015

(30) Foreign Application Priority Data
May 25, 2012 (EP) .................................... 12169528

(51) Int. Cl.
| | |
|---|---|
| C08G 69/26 | (2006.01) |
| C08G 69/32 | (2006.01) |
| C08G 69/34 | (2006.01) |
| C08G 69/36 | (2006.01) |
| C08L 77/06 | (2006.01) |
| C08L 77/08 | (2006.01) |
| C08G 18/60 | (2006.01) |

(52) U.S. Cl.
CPC .............. *C08G 69/26* (2013.01); *C08G 69/265* (2013.01); *C08G 69/32* (2013.01); *C08G 69/34* (2013.01); *C08G 69/36* (2013.01); *C08L 77/06* (2013.01); *C08L 77/08* (2013.01); *C08G 18/603* (2013.01); *Y10T 428/31725* (2015.04)

(58) Field of Classification Search
CPC . C08L 77/00; C08L 77/06; Y10T 428/31725; B32B 15/088; C08G 18/603
See application file for complete search history.

(56) References Cited

U.S. PATENT DOCUMENTS

| | | | | |
|---|---|---|---|---|
| 5,288,799 | A | * | 2/1994 | Schmid et al. ................... 525/66 |
| 2010/0144963 | A1 | * | 6/2010 | Buhler ................... C08G 69/26 524/607 |
| 2014/0316062 | A1 | * | 10/2014 | Janssen et al. ................ 524/607 |

FOREIGN PATENT DOCUMENTS

| | | | |
|---|---|---|---|
| WO | WO 97/11108 | | 3/1997 |
| WO | WO 98/40428 | | 9/1998 |
| WO | WO 02/16472 | | 2/2002 |
| WO | WO 2011/032822 | | 3/2011 |
| WO | WO2012/110413 | * | 8/2012 |

OTHER PUBLICATIONS

Brederode "Some diamines and polyamides containing Cyclohexane rings", PhD Thesis, Rotterdam, Jun. 1975.*
International Search Report for PCT/EP2013/060781, mailed Aug. 19, 2013, four pages.
Written Opinion of the ISA for PCT/EP2013/060781, mailed Aug. 19, 2013, six pages.
Anonymous: "Cationic printing or non-cationic dyeable polyamide fibres", *Research Disclosure*, vol. 55, No. 9, Nov. 1, 1968, four pages.

* cited by examiner

*Primary Examiner* — Gregory Listvoyb
(74) *Attorney, Agent, or Firm* — Nixon & Vanderhye P.C.

(57) ABSTRACT

The invention relates to a polyamide comprising units derived from: A. a diamine comprising in its structure at least one cyclohexane fragment according to Structure I, in which the substituents are in the 1,4-trans-position (Structure I), with n a positive integer of at least 1, and the proviso that when n is 2 or higher the cyclohexane rings are connected to each other through the 1,4-trans position, B. an aliphatic dicarboxylic acid with at least 13 carbon atoms and optionally comprising units derived from: C. one or more aliphatic dicarboxylic acids other than B, D. one or more diamines other than A, E. one or more monofunctional carboxylic acids or monofunctional amines, F. one or more polyfunctional monomers comprising carboxylic acid and/or amine groups, G. one or more lactams or corresponding amino acids. The invention further relates to a composition comprising such a polyamide and its uses.

Structure I

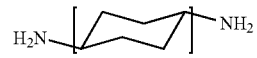

10 Claims, No Drawings

MELT-PROCESSABLE POLYAMIDE WITH HIGH MELTING TEMPERATURE

This application is the U.S. national phase of International Application No. PCT/EP2013/060781 filed May 24, 2013 which designated the U.S. and claims priority to EP Patent Application No. 12169528.2 filed May 25, 2012, the entire contents of each of which are hereby incorporated by reference.

The invention relates to a polyamide that is melt-processable while having a high melting temperature. The invention also relates to a composition comprising such a polyamide, to a process for the preparation of the polyamide and to the use of the polyamide.

Polyamides in general have a set of properties that make them very useful for application in a wide variety of fields of industry. They generally display a combination of good mechanical, electrical and thermal properties. Further, polyamides in general can be easily processed into various articles. This combination of favorable properties and ease of processing have made polyamides into a class of polymers that is widely used. Fields where polyamides are widely used are for example in the automotive industry, in electrical/electronic industry, in construction and building. Depending on the exact field of application additional requirements can be posed to the polyamide.

When polyamides are to be used in the automotive industry, high requirements are posed in respect of mechanical properties, such as for example high stiffness, fatigue resistance, tenacity and impact resistance. Further, good properties in respect of heat deflection temperature and moisture absorption are necessary to meet the strict requirements in this segment of industry.

When polyamides are to be used in the electrical/electronic industry, generally they need to have a high melting temperature as they should be able to resist the high temperatures used during for example the soldering step that is applied when mounting components onto a circuit board. However not all polyamides with a sufficient high melting temperature can be easily processed into small parts. Further, the polyamides used in the electrical/electronic industry also need to display a low tendency to absorb water/moisture as when the polyamide absorbs too much moisture the component made out of the polyamide tends to become dimensional instable, meaning that distortion of the component can take place, whereupon the component could lose its function.

In the construction field also high requirements are posed on the materials used to produce for example gears, switches and so forth. Particular properties here are for example moisture absorption, chemical resistance and abrasion resistance.

It is clear that a complex mix of properties is required for the polyamides and that the exact mix will depend on the field in which the polyamide will be used.

WO98/40428 describes a polyamide composition that is especially suitable for the preparation of car parts, whereby the heat deflection temperature and the moisture absorption are the most important properties. According to WO98/40428 a suitable polyamide can be prepared when in an aliphatic polyamide 1-40 wt % of the chain units is replaced by units derived from i) one or more cycloaliphatic dicarboxylic acids and an aliphatic diamine or ii) one or more cycloaliphatic diamines and an aliphatic dicarboxylic acid. Thus maximally 40 wt % of the chain units should be based on a cycloaliphatic compound. Apparently there is no preference for the acid or the amine to be cycloaliphatic. Incorporation of an amount higher than 40 wt % leads to a very disadvantageous crystallization behavior and an unacceptably high melting point. Both effects make that processing by means of for example injection moulding becomes impossible.

WO97/11108 describes a polyamide composition that is very suitable for the preparation of electrical and electronic components. The most important property here is the resistance under soldering conditions. Therefore, according to WO97/11108, the melting temperature of the polyamide should be well above the temperature involved in the soldering operation. This object can be reached according to WO97/11108 by an aliphatic polyamide wherein 1-40 wt % of the chain units is replaced by units derived from 1,4-cyclohexanediamine and an aliphatic dicarboxylic acid or 1,4-cyclohexanedicarboxylic acid and an aliphatic diamine. Thus in the aliphatic polyamide maximally 40 wt % of the chain units is based on a cyclohexane dicarboxylic acid or cyclohexane diamine. Incorporation of higher amounts than the 40 wt % leads to undesirable effects such as an impaired crystallization behavior that leads to a polymer that can't be processed anymore with the customary processing techniques, such as for example injection moulding. Further the materials in WO97/11108 display a relatively high level of moisture absorption, which in many applications is too high.

From WO97/11108 and WO98/40428 it becomes clear that certain material properties of substantially aliphatic polyamides can be improved by the incorporation of a limited amount of certain cycloaliphatic compounds. However some material properties of polyamides are still not satisfactory, such as crystallization behavior, melting point and moisture absorption. Therefore there is a need for an improved polyamide material that overcomes or at least diminishes the disadvantages of the prior art materials.

It has now been found that a polyamide with improved properties with respect to crystallization behavior, melting point and moisture absorption can be obtained. The polyamide according to the invention comprises units derived from:

A. a diamine comprising in its structure at least one cyclohexane fragment according to Structure I, in which the substituents are in the 1,4-trans-position,

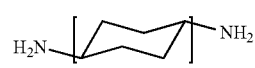

Structure I with n a positive integer of at least 1, and the proviso that when n is 2 or higher the cyclohexane rings are connected to each other through the 1,4-trans position, B. an aliphatic dicarboxylic acid with at least 13 carbon atoms, wherein 1) the units derived from diamine A make up more than 40 mol % based on the total amount of diamines,
2) the units derived from dicarboxylic acid B make up at least 70 mol % of the total of dicarboxylic acids, Preferably, the polyamide according to the invention further comprises one or more units derived from:

C. one or more aliphatic dicarboxylic acids other than B,
D. one or more diamines other than A,
E. one or more monofunctional carboxylic acids or monofunctional amines,
F. one or more polyfunctional monomers comprising at least three groups selected from carboxylic acid groups, amine groups and combinations thereof,
G. one or more lactams or corresponding amino acids, wherein:

1) the units derived from monofunctional monomer E are present in an amount of maximally 0.3 mol per kg of the total of all monomers A-G and 2) the units derived from the polyfunctional monomer F are present in an amount of maximally 0.3 mol per kg of the total of all monomers A-G.

It has surprisingly been found that a polyamide according to the present invention displays a very favorable combination of properties, especially a higher crystallinity, higher melting point and less moisture absorption. The polyamide according to the invention surprisingly combines these advantageous properties with the important possibility that it still can be melt-processed.

Polyamides with cyclohexane rings are already described by Kalmykova in Polymer Science of the USSR, 9 (1967), 2872. However the polyamides described there have a much too high melting point to make them melt-processable. Kalmykova also mentions the use of cis-1,4-diamino cyclohexane. Although the polyamide based on this cis-monomer has a lower melting point it is not suitable for use in the desired applications as its set of properties is not appropriate. Disadvantageous properties with the cis-monomer are for example a low crystallinity and thus low modulus above the glass transition temperature and higher moisture uptake.

With melt-processable is here and hereinafter meant that the polyamide that is subjected to melt-processing should have a melting temperature below 360° C. The melting temperature is determined by DSC according to ISO-11357-3.2, 2009.

The polyamide according to the invention has a low level of moisture absorption while it combines it with a high melting point. Prior art polyamides with a low level of moisture absorption generally combine this with a low melting temperature. Therefore the polyamide according to the invention provides a unique combination of low moisture absorption and still a high melting temperature. The low level of moisture absorption provides for a high level of dimensional stability for articles made out of the polyamide according to the invention.

The polyamide according to the invention comprises units derived from a diamine A) comprising in its structure at least one cyclohexane fragment according to Structure I, in which the substituents are in the 1,4-trans-position, Structure I

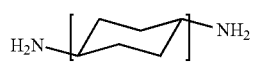

with n a positive integer of at least 1, and with the proviso that when n is 2 or higher the cyclohexane rings are connected to each other through the 1,4-trans position.

The structural unit according to structure I can repeat itself a number of times. This number is being indicated by the positive integer n. The value for n can be varied between wide ranges as long as n is an integer with a positive value. A suitable value for n can for example be between 1 and 5, preferably n is 1 or 2, more preferably n is 1. When n is 1, the preferred diamine comprising in its structure at least one cyclohexane fragment according to Structure I, is 1,4-trans-cyclohexanediamine. It is preferred to have a lower value for n, as the melt-processability is better with a lower value for n. When n has a value higher than 1, the separate ring structures should be connected with each other through the 1-position of the first ring structure and the 4-position of the second ring structure. An example of such a structure with n=3 is represented below:

Structure II

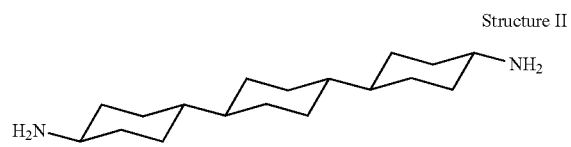 [SMILES: NC1CCC(C2CCC(C3CCC(N)CC3)CC2)CC1]

The cyclohexane fragment in general structure I can be substituted, for example with lower alkyl groups. With "lower alkyl groups" is here and hereinafter meant an alkyl group with 1-4 carbon atoms. Preferably the cyclohexane fragment is not substituted and thus has only hydrogen atoms attached to the carbon skeleton.

The polyamide according to the invention comprises next to units derived from diamine A) units derived from an aliphatic dicarboxylic acid B), with at least 13 carbon atoms. When the dicarboxylic acid has less than 13 carbon atoms, the melting point of the polyamide obtained is generally too high to make it commercially feasible to use it. In case the polyamide has a too high melting point for melt processing, thermal degradation occurs during the residence time in the melt, leading amongst others to blistering and changes in the molecular weight, discoloration and so forth.

The dicarboxylic acid B should be an aliphatic dicarboxylic acid as when other types of diacids, such as aromatic or cycloaliphatic dicarboxylic acids, are used the melting point increases to an unacceptable level. The number of carbon atoms in the aliphatic dicarboxylic acid is not particularly critical as long as it is at least 13. Preferably the number of carbon atoms in the aliphatic dicarboxylic acid is at least 16, more preferably the number of carbon atoms is more than 16. More preferably the dicarboxylic acid is 1,18-octadecanedioic acid or 1,19-nonadecanedioic acid.

It has been found that a polyamide made from the diamine A and an aliphatic dicarboxylic acid B has a very advantageous combination of properties, especially a favorable combination of melting point and level of moisture absorption.

In one preferred embodiment the dicarboxylic acid is a fatty acid and has between 13 and 22 carbon atoms. Such a fatty acid based dicarboxylic acid may be obtained by converting a fatty acid into a fatty acid based dicarboxylic acid. Methods for that are known by the skilled person. Oxidizing the fatty acid into the dicarboxylic acid enzymatically is for example published in Applied and Environmental microbiology, October 2003, 5992-5995 by Eshenfeld et al. Obtaining the fatty acid based dicarboxylic acid by chemical reactions is for example published in Angew. Chem. Int. Ed. 2010, 49, 4306-4308, by Mecking et. al.

Preferably the fatty acid based dicarboxylic acid contains 18 or 19 carbon atoms, since it has surprisingly been found that polyamides from these, in combination with 1,4-trans-cyclohexanediamine have high melting points while still being melt processable and also have very low water uptake.

More preferably the fatty acid based dicarboxylic acid has been obtained from stearic acid or a mixture of C18 saturated and unsaturated fatty acids, of which the unsaturations preferably have been hydrogenated. The diamines may be obtained by converting the carboxylic acid groups into amine groups by one of the well known reactions.

In another preferred embodiment the fatty acid based dicarboxylic acid has between 24 and 44 carbon atoms. Such dicarboxylic acids may be obtained by the dimerisation of a monomeric unsaturated fatty acid and are referred to as dimerised fatty acid.

After the dimerisation reaction, the so obtained oligomer mixture is further processed, for example by distillation, to yield a mixture having a high content of the dimerised fatty acid. The double bonds in the dimerised fatty acid may be saturated by catalytic hydrogenation. The term dimerised fatty acid as it is used here relates to both types of these dimerised fatty acids, the saturated and the unsaturated. The dimerised fatty acids preferably contain from 32 up to 44 carbon atoms. Most preferably the dimerised fatty acid contains 36 carbon atoms. The amount of C-atoms normally is an average value, since the dimerised fatty acids normally are commercially available as a mixture. It is also possible to produce a derivative of the dimerised fatty acid by replacing one or two of the acid groups by an amine group by one of the well known reactions.

Further details relating to the structure and the properties of the dimerised fatty acids may be found in the corresponding leaflet "Pripol C36-Dimer acid" of the company Croda, (former Unichema, Emmerich, Germany) or in the brochure of the Company Cognis (Düsseldorf, Germany) "Empol Dimer and Poly-basic Acids; Technical Bulletin 114C (1997)".

Preferably the fatty acid based dicarboxylic acid is a hydrogenated dimerised fatty acid because the present polyamides derived there from have higher thermal stability and with lower melting points in combination with very low water uptake. Hydrogenated dimerised fatty acids are obtained for example from Croda under the trade name Pripol 1009.

Next to the diamine A and the aliphatic dicarboxylic acid B, the polyamide according to the invention can optionally comprise units derived from C) one or more aliphatic dicarboxylic acids other than B and/or one or more diamines other than A and/or E) one or more monofunctional carboxylic acids or monofunctional amines and/or F) one or more polyfunctional monomers comprising carboxylic acid and/or amine groups and/or G) one or more lactams or corresponding amino acids. Although these units can be present in the polyamide, it is not necessary for them to be present to arrive at the advantages of the invention. Therefore all of them are optional.

Next to the diamine A, that comprises in its structure at least one cyclohexane fragment according to Structure I, one or more other diamines (D) may be present. This other diamine D may be aliphatic, cycloaliphatic or aromatic in nature. The number of carbon atoms in this optional diamine D is not particular critical. A suitable range for the number of carbon atoms is 1-44, preferably 2-10, more preferably 4-6. It has surprisingly been found that with a lower number of carbon atoms in the diamine D, a higher crystallinity and better mechanical properties, such as for example better stiffness at higher temperatures, can be reached. Most preferably the diamine D is 1,4-diamino butane. It is preferred to use the 1,4-diamino butane in an amount of at least 10 mol %, based on the total amount of diamines used.

When an optional diamine D is used next to the diamine A, the optional diamine D should be used in such an amount that the diamine A makes up at least 40 mol % of the total amount of diamines. Preferably the diamine D is present in an amount of at least 5 mol % and at most 60 mol %, based on the total amount of diamines. When more than 60 mol % of diamine D would be used, the crystallinity is disadvantageously influenced, the melting point is lowered and the moisture uptake increased.

The words "optional diamine D" are not meant to limit the diamine to only one diamine. Within the scope of the present invention, diamine D can also comprise more than 1 diamine other than diamine A. Therefore diamine D can refer to only one other diamine next to diamine A, but also to a combination of 2 or more diamines other than diamine A. The amounts given above for diamine D refer in the case that more than one diamine other than A is used, to the total of all diamines other than diamine A.

Next to the diamine A and the aliphatic dicarboxylic acid B, one or more aliphatic dicarboxylic acids other than B may be present (C). This dicarboxylic acid C should be aliphatic. It can either have a straight-chain, however it is also possible to use an aliphatic carboxylic acid with a branched chain. It is preferred to use a straight chain, with straight chain is meant that the chain does not contain substitutions. The polyamide that is obtained when the optional carboxylic acid is a straight chain aliphatic carboxylic acid has a higher crystallinity and lower moisture absorption. The number of carbon atoms in the chain of the dicarboxylic acid C can be odd or even, preferably it is even. The number of carbon atoms in the chain is not particularly critical, a suitable range is for example from 2-44. Preferably the number of carbon atoms in the dicarboxylic acid is at least 6, more preferably at least 10. With a higher number of carbon atoms in the dicarboxylic acid C, materials can be obtained with a higher thermal stability, allowing higher temperatures for melt processing.

The amount of aliphatic dicarboxylic acid C that is used in the preparation of the polyamide according to the present invention should not exceed 30 mol % based on the total amount of dicarboxylic acids. Preferably the amount of aliphatic dicarboxylic acid C is less than 25 mol %, more preferably less than 15 mol %. A lower amount of aliphatic dicarboxylic acid C is advantageous as the crystallinity of the resulting polyamide will be higher and the drop in melting point will be lower compared to polyamides that are prepared with a higher amount of dicarboxylic acid C.

Next to the diamine A and the aliphatic dicarboxylic acid B, one or more monofunctional carboxylic acids or monofunctional amines (E) may be present. The monofunctional component can be used to regulate, during synthesis, the molecular weight of the polyamide finally obtained. The character of the monofunctional component E is not particular critical, it can be aliphatic, cycloaliphatic or aromatic. The monofunctional monomer can be a carboxylic acid or a monofunctional amine. Examples of suitable monofunctional carboxylic acids are benzoic acid, aliphatic monocarboxylic acids with 1-24 carbon atoms such as for example acetic acid and propionic acid. An advantage of aliphatic monocarboxylic acids is that the polyamides obtained with them show less UV-absorption and are less prone to discoloration.

Examples of suitable monofunctional amines are aliphatic monoamines with 2-24 carbon atoms, such as for example dodecylamine or octadecylamine. An advantage of monoamines with more than 10 carbon atoms is that they are less volatile and thus are more efficiently built in into the polymer.

The amount of monofunctional component E that is used in the preparation of the polyamide according to the invention should not exceed the level of 0.3 mol per kg of the total of all monomers A, B, C, D, E, F and G, further shortly abbreviated to "A-G". Preferably the level of component E should not exceed 0.2 mol per kg of the total of all monomers A-G, as with a lower level of component E higher molar masses are obtained. For obtaining polyamides that are especially suitable for extrusion, preferably component E is not used at all, thus a level of 0 mol per kg of the total of all monomers A-G.

Next to the diamine A and the aliphatic dicarboxylic acid B, one or more polyfunctional monomers (F) comprising carboxylic acid and/or amine groups may be present. This allows control over the melt rheology behavior, for example allows a higher shear dependency of the melt viscosity. Preferably the polyfunctional monomer is 3-functional and has at least 4 carbon atoms. A preferred monomer is bis-hexamethylene-diamine.

The amount of polyfunctional component F that is used in the preparation of the polyamide according to the invention should not exceed the level of 0.3 mol per kg of the total of all monomers A, B, C, D, E, F and G, further shortly abbreviated to "A-G". Preferably the level of component F should not exceed 0.2 mol per kg of the total of all monomers A-G, as with a lower level of component F gelation is avoided. More preferably component F is not used at all, thus a level of 0 mol per kg of the total of all monomers A-G. A lower level of component F leads to higher flow, which is advantageous in for example applications in the electric and electronic field, such as for example in connector applications.

Next to the diamine A and the aliphatic dicarboxylic acid B, one or more lactams and/or one or more corresponding amino acids may be present. This building block for the polyamide will be referred to as component G. Therefore with component G can be meant one or more lactams, one or more amino acids or a combination of one or more lactams and one or more amino acids. The lactam can be added to obtain a polyamide with a lower melting point. The amount of component G used in the preparation of the polyamide according to the present invention should not exceed 20 mol %, based on the total amount of difunctional monomers. Preferably component G is present in an amount less than 15 mol %, more preferably no component G is used at all, thus preferably component G is present in an amount of 0 mol %.

The optional components C, D, E, F and G can be used separately with the required components A and B, however it is also possible that more than one optional component is used next to the required components A and B. So is it for example possible to use component C together with D or E or F or G next to A and B, however it is also possible to use component C with any combination of D, E, F and G next to the required components A and B. It is also possible to use component D together with C or E or F or G next to A and B, however it is also possible to use component D with any combination of C, E, F and G next to the required components A and B. It is also possible to use component E together with C or D or F or G next to A and B, however it is also possible to use component E with any combination of C, D, F and G next to the required components A and B. It is also possible to use component F together with C or D or E or G next to A and B, however it is also possible to use component F with any combination of C, D, E and G next to the required components A and B. It is also possible to use component G together with C or D or E or F next to A and B, however it is also possible to use component G with any combination of C, D, E and F next to the required components A and B.

The present invention also relates to a composition comprising a polyamide according to the invention and at least one secondary component. Examples of secondary components are given in the "Plastics additives Handbook", by H. Zweifel, R. Maier and M. Schiller, 6$^{th}$ edition, 2009, Hanser Verlag, ISBN 9781569904305. Examples of secondary components are glass fibers, pigments, flame retardants and stabilizers.

The present invention also relates to a process for the preparation of a polyamide according to the invention wherein the process at least comprises the following step:
  providing the starting materials: a diamine A comprising in its structure at least one cyclohexane fragment according to Structure I,

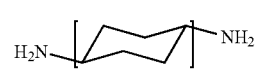
Structure I an aliphatic dicarboxylic acid B with at least 13 carbon atoms, one or more aliphatic dicarboxylic acids other than B (C), one or more diamines other than A (D), one or more monofunctional carboxylic acids or monofunctional amines (E), one or more polyfunctional monomers comprising carboxylic acid and/or amine groups (F) and one or more lactams or corresponding amino acids (G) and
  initiating the polycondensation between the starting materials at elevated pressure and at elevated temperature, optionally in the presence of a polycondensation catalyst.

The new polyamide according to the invention can be obtained with the aid of polycondensation methods known per se. Often use is made of a two-step process in which, in the first step, the polycondensation of the initial diamine A and dicarboxylic acid B and optionally aliphatic dicarboxylic acid other than B (C), diamine other than A (D), monofunctional carboxylic acid or monofunctional amine (E), polyfunctional monomer (F) and/or lactam or corresponding amino acid (G) is initiated at elevated pressure, at a temperature of about 200-300° C., optionally in the presence of a polycondensation catalyst. In that case, the monomers may or may not be present in the form of the corresponding salts. The pressure is generally kept between about 1 and 2 MPa and the water formed in the polycondensation is removed. After a reaction time of between 0.5 and 3 hours, the temperature is raised while the pressure is simultaneously relieved, so that the low-molecular weight polyamide obtained remains in the melt. This melt is subsequently condensed further for 2-5 hours, at a temperature above the melting point of the polyamide, in a vacuum, optionally with a nitrogen vent.

The invention further also relates to the use of a polyamide according to the invention or a composition comprising the polyamide and at least one secondary component, for the production of injection molded or extruded articles or as a component in electrical and electronic application, automotive application, packaging application or solar back panel application.

EXPERIMENTAL

Relative Viscosity

The relative viscosity was measured for the polymers obtained by post-condensation. The measurement of the relative viscosity was performed based on ISO 307. For the measurement a pre-dried polymer sample was used, the drying of which was performed under high vacuum (i.e. less than 50 mbar) at 105° C. during 16 hrs. Determination of the relative viscosity was done at a concentration of 1 gram of polymer in 100 g of m-kresol at 25.00±0.05° C. The flow time of the solution (t) and the solvent (t0) were measured using a DIN-Ubbelohde from Schott (Capillar constante 0.3 and internal diameter 1.5 mm) at 25° C. The relative viscosity is defined as t/t0 and is corrected for the Haagenbach correction.
Thermal Characterisation by DSC (According to ASTM D3417-97 E793-85/794-85)
Determination of the Melting Temperature, $T_m$:

The measurement of the second melting temperature $T_m$ was carried out with a Mettler Toledo Star System (DSC) using a heating and cooling rate of 10° C./min. in a $N_2$ atmosphere. For the measurement a sample of about 5 mg pre-dried powdered polymer was used. The pre-drying was carried out at high vacuum, i.e less than 50 mbar and a 105° C. during 16 hrs. The sample was heated from 20° C. to the maximum temperature, Tmax, at 10° C./min, immediately cooled to 0° C. at 10° C./min, kept at 0° C. for 5 min and subsequently heated to Tmax again at 10° C./min. For the melting temperature $T_m$ the peak value of the melting peak in the second heating cycle was determined.

Determination of the Melt Enthalpy

For the melt enthalpy the integral value of the melting peak in the second heating cycle was determined.

EXAMPLES

In the below examples a short-hand notation is used for 1,4-trans-cyclohexanediamine which is abbreviated to DACH, 1,18-octanedioic acid is abbreviated to 18 and dimerised fatty acid Pripol 1009 is abbreviated to 36.

Example 1

Preparation of a polyamide PA DACH18

A salt was produced by charging a 2 liter autoclave with 1,4-trans-cyclohexanediamine (1.94 mol), 346.3 g water, 1.18 octanedioic acid (1.87 mol) in that order while stirring. The mixture was heated from 37° C. to 220° C. in 35 minutes. The mixture was kept for 5 min at 220° C. Thereafter the mixture was heated to 250° C. while removing 256 g water by distillation over 40 minutes. Then the reaction mixture was released into an atmospheric inertised vessel and the polyamide was obtained as a solid powder. The prepolymer thus obtained was subsequently crushed to particles sized between 1-20 mm and subsequently post condensed in a stream of N2/H20 (1800/700 g/h) at 240° C. during 16 hours.

Experimental melting point in the second heating (Tm2): 333° C. (Tmax in the DSC measurement=380° C.).

Example 2

Preparation of a Polyamide PA DACH18/418 (0.90/0.10 Mol/Mol)

A salt was produced by charging a 2 liter autoclave with 1,4-trans-cyclohexanediamine (1.80 mol), 1,4-diaminobutane (0.28 mol), water (357 g), 1.18 octanedioic acid (1.92 mol) in that order while stirring. The mixture was heated from 37° C. to 210° C. in 35 minutes. The mixture was kept for 5 min at 210° C. Then the mixture was heated to 240° C. while removing 270 g water by distillation over 40 minutes. Thereafter the reaction mixture was released into an atmospheric inertised vessel and the polyamide was obtained as a solid powder. The prepolymer thus obtained was subsequently crushed to particles sized between 1-20 mm and subsequently post condensed in a stream of N2/H20 (1800/700 g/h) at 240° C. during 16 hours.

Experimental melting point in the second heating (Tm2): 310° C. (Tmax in the DSC measurement=380° C.).

Example 3

Preparation of a Polyamide PA DACH36

A salt was produced by charging a 2 liter autoclave with 1,4-trans-cyclohexanediamine (1.25 mol), water (90 g), hydrogenated (saturated) dimer fatty dicarboxylic acid Pripol 1009 from Croda (molecular weight, M=565 g/mol, 1.18 mol). The mixture was heated after inertisation from 37° C. to 220° C. in 35 minutes. The mixture was kept for 30 min at 220° C. Then the pressure was reduced to atmospheric pressure over 2 hours while maintaining a reaction temperature of 220° C. After the pressure was atmospheric, the temperature was raised to 250° C. in a period of 1 hour and kept at that temperature for 3 hours. The reaction melt was released from the autoclave by overpressure pressurizing and granulated after cooling. The product was dried in vacuum at 80° C. for 24 hours.

Experimental melting point in the second heating Tm2: 201.7° C. (Tmax in the DSC measurement=280° C.). Melt enthalpy in the second heating ΔHm2: 27 J/g.

Relative viscosity (RV) in m-kresol: 1.67.

Equilibrium moisture uptake of a 0.5 mm thick melt pressed film in water at 40° C., determined by weight loss (pressed by keeping material between two plates at 250 C for 5 min and cooling over 5 min to room temperature): 0.1 wt. %.

The invention claimed is:

1. A polyamide comprising units derived from:
(A) a diamine comprising in its structure at least one cyclohexane fragment according to Structure I, in which the substituents are in the 1,4-trans-position,

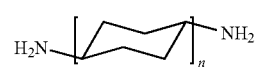

Structure I wherein n is a positive integer of at least 1, with the proviso that when n is 2 or higher the cyclohexane rings are connected to each other through the 1,4-trans position, and
(B) an aliphatic dicarboxylic acid selected from the group consisting of 18 octadecanedioc acid, 1, 19-nonadecanedioic acid and fatty acids having between 13 and 22 carbon atoms, wherein
1) the units derived from the diamine (A) make up more than 40 mol % based on the total amount of diamines, and wherein
2) the units derived from the dicarboxylic acid (B) make up at least 70 mol % of the total of dicarboxylic acids.

2. The polyamide according to claim 1, further comprising one or more units derived from:
(C) one or more aliphatic dicarboxylic acids other than B,
(D) one or more diamines other than A,
(E) one or more monofunctional carboxylic acids or monofunctional amines,
(F) one or more polyfunctional monomers comprising at least three groups selected from carboxylic acid groups, amine groups and combinations thereof, and
(G) one or more lactams or corresponding amino acids, wherein:
1) the units derived from monofunctional monomer (E) are present in an amount of maximally 0.3 mol per kg of the total of all monomers (A)-(G), and 2) the units derived from the polyfunctional monomer (F) are present in an amount of maximally 0.3 mol per kg of the total of all monomers monomers (A)-(G).

3. The polyamide according to claim 1 wherein the diamine (A) is 1,4-trans-cyclohexanediamine.

4. The polyamide according to claim 1, wherein the dimerised fatty acid is hydrogenated.

5. The polyamide according to claim 2, wherein at least one of the diamines other than the diamine (A), is 1,4-diamino butane.

6. The polyamide according to claim 5, wherein the 1,4-diamino butane is present in an amount of at least 10 mol %, based on the total amount of diamines.

7. The polyamide according to claim 2, wherein the dicarboxylic acid other than the dicarboxylic acid (B) has at least 12 carbon atoms.

8. A composition comprising a polyamide according to claim 1 and at least one secondary component.

9. An injection molded or extruded article which comprises the polyamide according to claim 1.

10. A component for electrical or electronic applications, automotive applications, packaging applications or solar back panel applications, wherein the component comprises the polyamide according to claim 1.

* * * * *